F. H. VAN HOUTEN.
DOUGH HOPPER OR TROW.
APPLICATION FILED JUNE 7, 1913.
1,189,021.
Patented June 27, 1916.
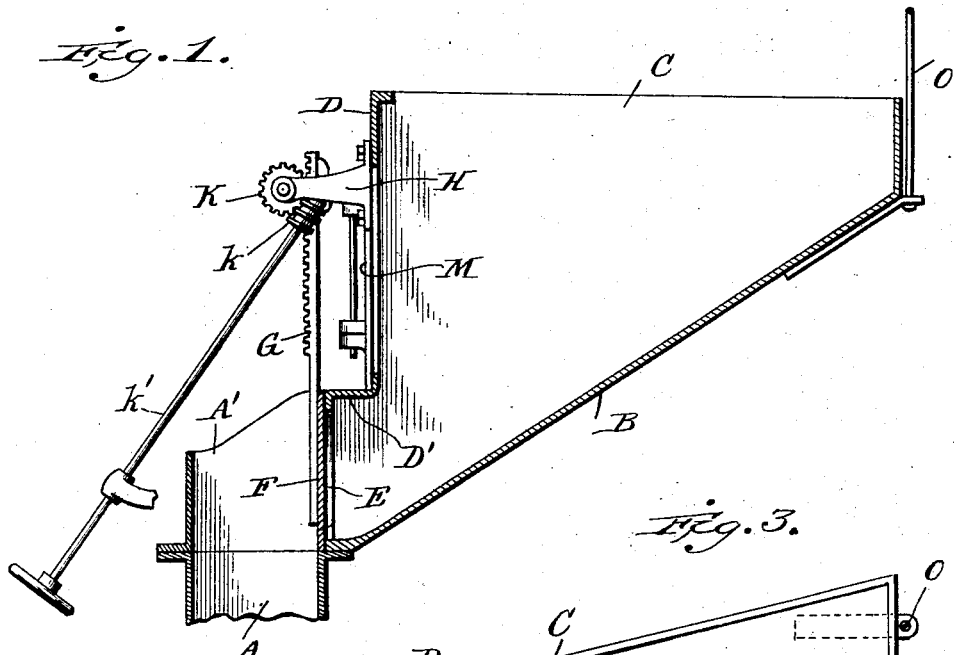
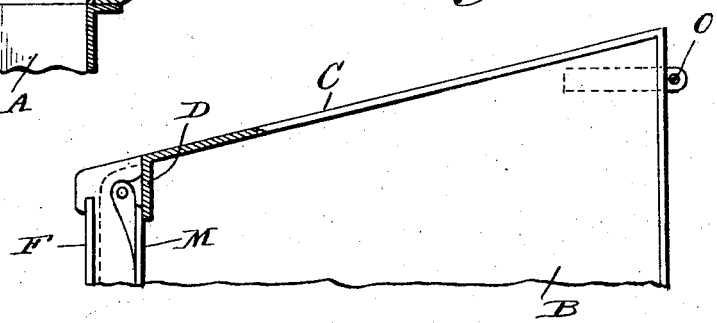
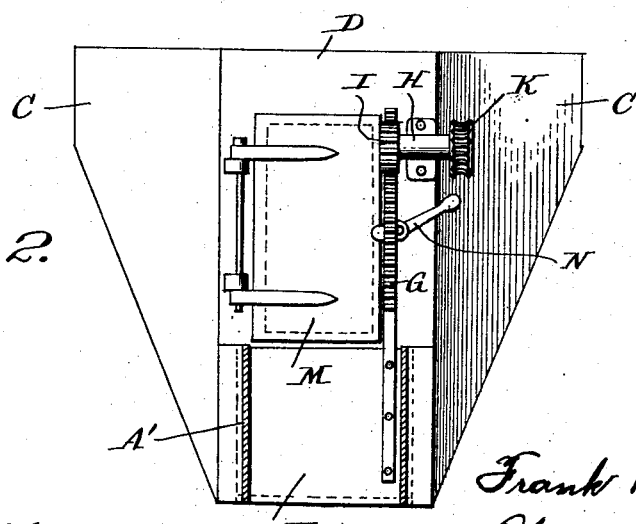
Witnesses
Halbert P. Brown
M. G. Crandell
Inventor
Frank H. Van Houten
By Church & Church
his Attorneys

UNITED STATES PATENT OFFICE.

FRANK H. VAN HOUTEN, OF FISHKILL-ON-THE-HUDSON, NEW YORK.

DOUGH HOPPER OR TROW.

1,189,021. Specification of Letters Patent. Patented June 27, 1916.

Application filed June 7, 1913. Serial No. 772,442.

*To all whom it may concern:*

Be it known that I, FRANK H. VAN HOUTEN, a citizen of the United States, residing at Fishkill-on-the-Hudson, in the county of Duchess and State of New York, have invented a certain new and Improved Dough Hopper or Trow; and I do hereby declare the following to be a full, clear, and exact description of the same, reference being had to the accompanying drawings, forming part of this specification, and to the figures and letters of reference marked thereon.

The present invention has for its object to provide an improved hopper or trow in which the dough in bakeries is held prior to being divided into portions suitable for loaves. The hoppers or trows in which the dough is held at this stage of manufacture are usually of such character that the dough may rise therein, and in most instances they are movable about the apartment on suitable trucks.

In accordance with the present invention, however, the hopper or trow occupies a fixed position near the upper portion or ceiling of the room or apartment and is adapted to receive the mixed batch of dough from the room or apartment above through a suitable opening in the flooring and from the bottom of the hopper or trow the dough is discharged into the hopper of the dividing machine.

Referring to the accompanying drawings,—Figure 1 is a sectional elevation of a hopper or trow embodying the present improvements; Fig. 2 is a front elevation of the same omitting the hand wheel for opening the sliding gate and its shaft and worm. Fig. 3 is a top plan view partly in section of one side of the hopper or trow.

Like letters of reference in the several figures indicate the same parts.

The hopper or trow of the present invention is, as before stated, adapted to be suspended in the upper part of the room or apartment or in proper position to discharge its contents downwardly through a chute indicated in Fig. 1 at A, which forms a part of or leads into the hopper of the dough dividing machine. The hopper itself is shaped to direct and deliver the dough in a confined mass and, in the present instance, embodies a long inclined bottom portion B, diverging sides C and a front D, which occupies the space between the proximate edges of the diverging sides C. The front D of the hopper at its lower portion is preferably offset forwardly with respect to the upper portion of the front, as shown at D' in Fig. 1, and this forwardly offset portion is provided with a discharge outlet E adapted to be closed by a lifting gate F for permitting the contents of the hopper to pass out into the chute A.

The gate F is moved by suitable gearing which, as shown, embodies a rack bar G connected with the gate, and at its upper end held by a suitable guiding bracket H in engagement or mesh with a pinion I. The pinion I is journaled in the bracket H and on the opposite end of the shaft carrying the pinion there is mounted a worm wheel K with which a worm $k$ on a diagonally or downwardly extending shaft or rod $k'$ is adapted to mesh. The rod $k'$ carries at its lower end a hand wheel by which it may be rotated by rotating the worm wheel and pinion and elevating or lowering the gate F. Regulation of the size of the discharge outlet and consequently of the amount of dough passing through the opening is thus afforded by simply rotating the hand wheel.

Immediately above the gate F the front D of the hopper is provided with a door M adapted to swing outwardly, and, to accommodate the door without interfering with the gate operating mechanism, the gate operating mechanism is located off at one side of the front D, as will be readily understood from Fig. 2 of the drawing. The door closes a relatively large opening in the front of the hopper through which opening access may be had to the interior of the hopper for cleaning purposes or for scraping down any dough which, by accident, may adhere to the wall. For holding the door in its closed position a clamping latch, such as that indicated at N, is pivoted on the front D in position to coöperate with the free edge of the door.

By locating the clean out opening in the hopper above the discharge outlet, it is possible to clean the interior of the hopper without danger of waste matter and refuse falling into the chute and spoiling the dough in the dough dividing machine below. This location of the said opening is also advantageous because it permits the introduction of a tool for scraping the side walls of the hopper to dislodge any dough which may adhere thereto, without interference with dough passing through the outlet. In this way a maximum quantity of dough in the hopper may be utilized and cleaning may be effected without danger of spoiling the dough in other machinery.

It is designed that the dough shall normally gravitate down the inclined bottom and be directed by the shape of the hopper and automatically discharged from the openings in a substantially confined mass at the lower end of the inclined bottom when the gate F is opened, whereby under normal operating conditions no hand manipulation or handling of the dough becomes necessary.

For convenience in supporting the hopper it may be suspended by rods O at the rear end and at its forward end it may be supported directly on the chute or hopper A, although, as will be readily understood, suspending rods may also be employed at the front. As a part of the hopper there should be provided around the discharge opening which is closed by the gate F a guard A' which is in effect an upward extension of the chute or hopper A. This guard A' extends upwardly a sufficient distance to prevent any of the dough overflowing.

Having thus described my invention, what I claim as new and desire to secure by Letters Patent of the United States, is:

1. In a dough hopper, the combination with the hopper body, embodying an inclined bottom, forwardly converging side walls, a front vertical wall having its lower portion offset forwardly with relation to its upper portion, an outlet in said lower offset portion of the front wall through which the dough may be discharged, a vertically sliding gate for closing the discharge outlet and adapted to regulate the quantity of the discharge, and a hinged clean out door in the upper recessed portion of the front vertical wall of the hopper body, said door lying in a plane to the rear of the gate so as not to interfere with the vertical movement of the gate.

2. In a dough hopper, the combination with the hopper body embodying an inclined bottom, forwardly converging side walls, a front vertical wall having its lower portion offset forwardly with relation to its upper portion, an outlet in the lower offset portion of the front wall through which the dough may be discharged, a vertically sliding gate for closing the discharge outlet and adapted to regulate the quantity of the discharge, a hinged clean-out door in the upper recessed portion of the front vertical wall of the hopper body, said door lying in a plane to the rear of the gate so as not to interfere with the vertical movement of the gate, a rack extending upwardly from the gate and located to the side of the door, whereby said rack will not interfere with the opening and closing of the door, and gearing connections for operating said rack to impart upward and lowering movements to the gate.

FRANK H. VAN HOUTEN.

Witnesses:
J. M. VAN HOUTEN,
WILLIAM T. STRIPPEL.

Copies of this patent may be obtained for five cents each, by addressing the "Commissioner of Patents Washington, D. C."